Jan. 27, 1925.

A. NYMAN 1,524,629

MODULATING SYSTEM FOR OSCILLATION GENERATORS

Filed Jan. 26, 1921

WITNESSES:
A. G. Schiefelbein
O. B. Buchanan

INVENTOR
Alexander Nyman.
BY
Wesley S. Carr
ATTORNEY

Patented Jan. 27, 1925.

1,524,629

UNITED STATES PATENT OFFICE.

ALEXANDER NYMAN, OF WILKINSBURG, PENNSYLVANIA, ASSIGNOR TO WESTINGHOUSE ELECTRIC & MANUFACTURING COMPANY, A CORPORATION OF PENNSYLVANIA.

MODULATING SYSTEM FOR OSCILLATION GENERATORS.

Application filed January 26, 1921. Serial No. 439,922.

*To all whom it may concern:*

Be it known that I, ALEXANDER NYMAN, a citizen of the United States, and a resident of Wilkinsburg, in the county of Allegheny and State of Pennsylvania, have invented a new and useful Improvement in Modulating Systems for Oscillation Generators, of which the following is a specification.

My invention relates to wireless transmitting systems and particularly to improved means for modulating the radiated waves without materially varying their frequency.

In my application, Serial No. 396,530, filed July 15, 1920, I have shown a modulating system wherein the frequency of the radiated waves is varied by means of sound-controlled reactances.

In an application by P. E. Wiggin, Serial No. 439,952, filed January 26, 1921, and assigned to the Westinghouse Electric & Mfg. Co., is shown a modulating system employing similar sound-controlled reactances for the purpose of varying the amplitude of the radiated waves without substantially varying their frequency.

The object of my invention is to produce an improved method of accomplishing the last-named result.

A further object of my invention is to devise a modulating system for electron-tube oscillation generators, wherein provision is made for the adjustment of the phase of the grid currents.

Figure 1:
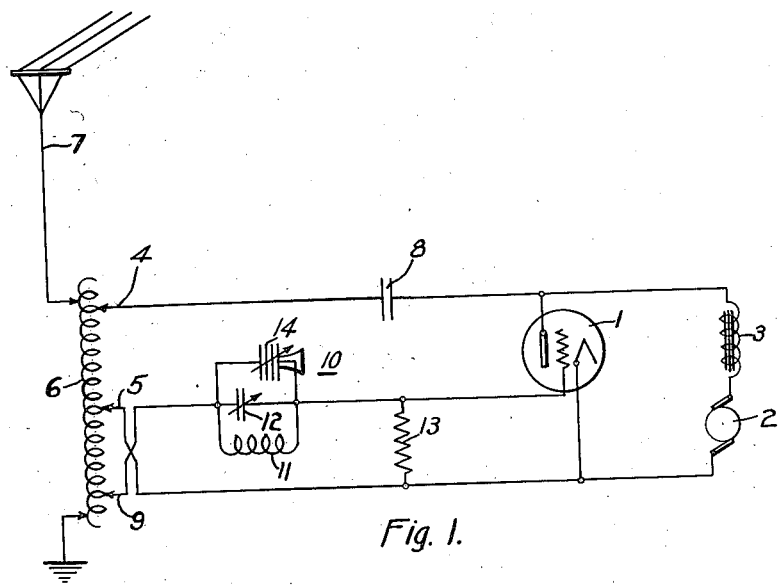
Figure 2:
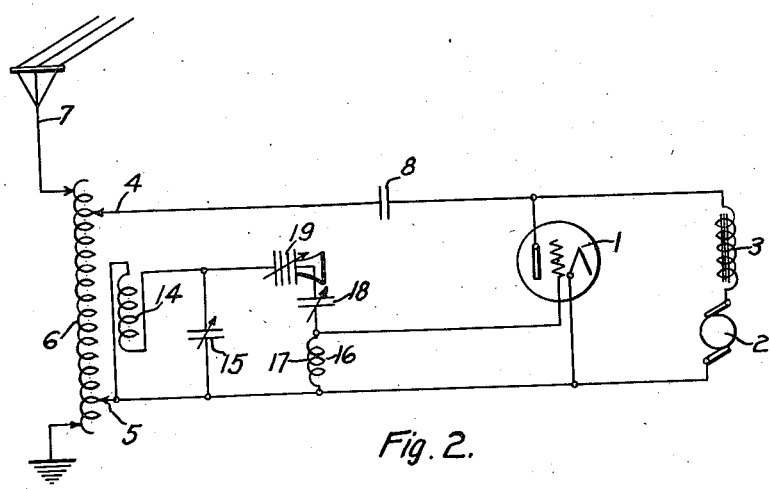

In the accompanying drawing, Figures 1 and 2 are diagrammatic views of two embodiments of my invention.

In the apparatus shown in Fig. 1, a triode 1 is employed as an oscillation generator, receiving power from a direct-current source 2, which is connected across its plate and filament terminals, respectively. A choke coil 3 may be included in the direct-current circuit for preventing the flow of radio-frequency currents therein. The plate and filament terminals are also connected, respectively, to adjustable taps 4 and 5 of an inductance coil 6, the latter forming part of an antenna circuit 7. A condenser 8 is included in the connections between the plate and the adjustable tap 4 for the purpose of preventing the short circuiting of the direct-current source.

The grid circuit of the triode is coupled to the plate circuit by means of the adjustable tap 9 of the inductance coil 6, the tap 9 being connected to the grid of the triode. Included in the connection between the adjustable tap 9 and the grid is a parallel resonant circuit 10, comprising an inductance coil 11 and a variable condenser 12. In order to permit potentials of the proper value to be built up on the grid, a grid leak 13 is provided for the parallel resonant device 10.

The parallel resonant device 10 is so adjusted that it is nearly but not quite in exact resonance condition, and it is shunted by a condenser transmitter 14 in order to cause it to approach and recede from the condition of exact resonance in accordance with the sound waves entering the transmitter.

In operation, when sound waves enter the transmitter, the distance between the plates of the transmitter condenser is varied, thus varying the capacity. The impedance of the grid circuit is thereby varied in such manner that the amplitude of the plate currents is strongly varied in accordance with the sound waves entering the transmitter. The frequency of the radio waves is determined by the tuning of the antenna circuit, or by other means well known in the art.

In the apparatus shown in Fig. 2, the plate circuit is connected as shown in Fig. 1. The coupling between the plate and grid circuits in Fig. 2 is accomplished by means of an inductance coil 14 in inductive relationship with the coil 6. The coil 14 is shunted by a variable condenser 15 forming therewith a tuned circuit.

The coil 14 is also shunted by a series resonant circuit 16, comprising an inductance coil 17 and a variable condenser 18. The common terminal of the coil 17 and the condenser 18 is connected to the grid, and the remaining terminal of the coil 17 is connected to the filament. Modulation is effected by means of a condenser transmitter 19, which is connected in series with the series resonant circuit 16.

In operation, the series resonant circuit 16 is so adjusted that it is nearly in the condition of series resonance, and it is caused to approach and recede from the condition of exact resonance by means of the variations of the transmitter condenser. By adjusting the tune of the coupling circuit 14, 15, and also the tune of the series resonant circuit 17, 18, the phase of the voltage applied to the grid may be regulated in order to secure the best operating condition.

While I have shown two embodiments of my invention in the appending drawing, I do not wish to be restricted thereto, but I desire that only such restrictions shall be placed on my invention as are set forth in the appended claims.

I claim as my invention:

1. An electron-tube oscillation generator, including a plate circuit, an inductance coil coupled to said plate circuit, a variable condenser connected across the terminals of said inductance coil, a series resonant circuit also connected across the terminals of said coil, connections connecting the terminals of one of the elements of said series resonant circuit to the grid and filament terminals, respectively, of said electron tube, and variable reactance means included in said series resonant circuit.

2. An electron-tube oscillation generator including a plate circuit, an inductance coil coupled to said plate circuit, a variable condenser connected across the terminals of said inductance coil, a series resonant circuit also connected across the terminals of said coil, and connections connecting the terminals of one of the elements of said series resonant circuit to the grid and filament terminals, respectively, of said electron tube, said series resonant circuit including a condenser transmitter having a capacitance which is varied in accordance with sound waves.

3. In an electron-tube oscillation generator system, including a plate circuit and a grid circuit coupled thereto, the combination with said grid circuit, of a plurality of parallel reactance paths, one of said paths being an approximately resonant modulating circuit, and means for varying the reactance of said modulating circuit in accordance with signals to be transmitted.

4. In an electron-tube oscillation generator system, including a plate circuit and a grid circuit coupled thereto, the combination with said grid circuit, of a plurality of parallel reactance paths, one of said paths being an approximately resonant modulating circuit including a condenser transmitter having a capacitance which is varied in accordance with sound waves.

In testimony whereof, I have hereunto subscribed my name this 20th day of January, 1921.

ALEXANDER NYMAN.